(12) United States Patent
Porte et al.

(10) Patent No.: US 12,134,982 B2
(45) Date of Patent: Nov. 5, 2024

(54) STRIP-FORM ACOUSTIC MATERIAL HAVING AN INTEGRATED FLANGE, AND INTERNAL WALL OF AN AIRCRAFT AIR INTAKE MADE WITH THIS MATERIAL

(71) Applicant: Airbus Operations SAS, Toulouse (FR)

(72) Inventors: Alain Porte, Toulouse (FR); Jacques Lalane, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 519 days.

(21) Appl. No.: 17/387,554

(22) Filed: Jul. 28, 2021

(65) Prior Publication Data
US 2022/0034260 A1 Feb. 3, 2022

(30) Foreign Application Priority Data
Jul. 31, 2020 (FR) ........................................ 2008163

(51) Int. Cl.
| *F02C 7/04* | (2006.01) |
|---|---|
| *B32B 1/08* | (2006.01) |
| *B32B 3/04* | (2006.01) |
| *B32B 3/06* | (2006.01) |
| *B32B 3/14* | (2006.01) |

(Continued)

(52) U.S. Cl.
CPC ................. *F02C 7/04* (2013.01); *B32B 1/08* (2013.01); *B32B 3/04* (2013.01); *B32B 3/06* (2013.01); *B32B 3/14* (2013.01); *B32B 3/266* (2013.01); *B32B 5/02* (2013.01); *B32B 5/26* (2013.01); *B32B 15/02* (2013.01); *B64D 33/02* (2013.01); *F02C 7/045* (2013.01); *B32B 2260/021* (2013.01); *B32B 2260/046* (2013.01); *B32B 2262/103* (2013.01); *B32B 2307/102* (2013.01);

(Continued)

(58) Field of Classification Search
CPC ... F02C 7/04; F02C 7/045; B32B 1/08; B32B 3/04; B32B 3/06; B32B 3/14; B32B 3/266; B32B 5/02; B32B 5/26; B32B 15/02; B32B 2260/021; B32B 2260/046; B32B 2262/103; B32B 2605/18; B64D 33/02; F05D 2220/323
See application file for complete search history.

(56) References Cited

U.S. PATENT DOCUMENTS

| 6,451,447 B1 | 9/2002 | Ragland et al. | |
|---|---|---|---|
| 6,772,857 B2 * | 8/2004 | Porte ...................... | F02K 1/827 244/1 N |

(Continued)

FOREIGN PATENT DOCUMENTS

| DE | 8713619 U1 | 2/1989 |
|---|---|---|
| FR | 2764234 A1 | 12/1998 |

(Continued)

OTHER PUBLICATIONS

French Search Report; priority document.

*Primary Examiner* — Forrest M Phillips
(74) *Attorney, Agent, or Firm* — Greer, Burns & Crain, Ltd.

(57) ABSTRACT

A strip-form acoustic material, the strip having a length in a longitudinal direction, a width in a transverse direction, a thickness and axial ends. At least one of the axial ends of the strip, in an end portion of the length of the strip, the strip of material is folded in a substantially transverse plane.

8 Claims, 3 Drawing Sheets

(51) Int. Cl.
*B32B 3/26* (2006.01)
*B32B 5/02* (2006.01)
*B32B 5/26* (2006.01)
*B32B 15/02* (2006.01)
*B64D 33/02* (2006.01)
*F02C 7/045* (2006.01)

(52) U.S. Cl.
CPC .. *B32B 2605/18* (2013.01); *B64D 2033/0206* (2013.01); *F05D 2220/323* (2013.01)

(56) References Cited

U.S. PATENT DOCUMENTS

| | | | |
|---|---|---|---|
| 11,027,817 B2 * | 6/2021 | Porte | G10K 11/172 |
| 2001/0005937 A1 * | 7/2001 | Andre | B32B 27/281 |
| | | | 264/258 |
| 2004/0016595 A1 * | 1/2004 | Andre | G10K 11/172 |
| | | | 181/290 |
| 2007/0246296 A1 | 10/2007 | Xiao et al. | |
| 2012/0156006 A1 | 6/2012 | Murray et al. | |
| 2014/0077031 A1 * | 3/2014 | Benedetti | B32B 15/01 |
| | | | 428/603 |

FOREIGN PATENT DOCUMENTS

| | | |
|---|---|---|
| GB | 2301552 A | 12/1996 |
| KR | 101039348 B1 | 6/2011 |

* cited by examiner

STRIP-FORM ACOUSTIC MATERIAL HAVING AN INTEGRATED FLANGE, AND INTERNAL WALL OF AN AIRCRAFT AIR INTAKE MADE WITH THIS MATERIAL

CROSS-REFERENCES TO RELATED APPLICATIONS

This application claims the benefit of the French patent application No. 2008163 filed on Jul. 31, 2020, the entire disclosures of which are incorporated herein by way of reference.

FIELD OF THE INVENTION

The present application relates to a strip-form acoustic material and to a resistive skin manufactured from this material. The invention applies more particularly to the manufacture of the internal wall of the air intake of the aircraft nacelles.

BACKGROUND OF THE INVENTION

It will be recalled that an aircraft nacelle comprises, from the front to the rear, a first portion in the upstream direction of the aerodynamic flow, known as the air intake, a second portion that covers the casing of the engine fan, known as the fan cowl, and a third portion that generally has a thrust reversal zone which surrounds the engine turbine body in the downstream direction of the aerodynamic flow.

An air intake, such as the one illustrated in the appended FIG. 2, usually comprises structural elements such as a front frame 101 and a rear frame 104, and, from the front to the rear of the nacelle, a lip 100, external panels 102 that continue the lip on the outside of the nacelle (and form an external wall of the air intake), and an internal wall 103 that continues the lip on the inside of the nacelle and delimits a central duct for channeling the air in the direction of the engine, the external panels and the internal wall being supported by the front frame 101 and the rear frame 104.

The shape of the air inlet and the systems with which it is equipped need to make it possible to avoid the formation and/or accumulation of ice or frost, to ensure an aerodynamic function, to prevent the penetration of birds into the fan compaitment containing the engine systems, and to limit the impact of noise. To meet this last objective, the internal wall 103 is an acoustic treatment wall, which usually comprises:
  a perforated or micro-perforated resistive skin which forms the visible face of the wall (face oriented towards the inside of the central duct of the air intake); the objective of this resistive skin is to allow sound waves to pass through and possibly also to dissipate, at least partially, the energy of the sound waves in the form of heat,
  a rear skin that essentially has the function of ensuring the structural integrity of the wall,
  a cellular damping core, generally of honeycomb structure, on either side of which the resistive skin and the rear skin are fastened, the core being involved in both the mechanical integrity and acoustic damping, the main function of the core being to trap and damp the sound waves.

Two main techniques exist for manufacturing the resistive skin of the internal wall of the air intakes and forming this wall.

According to a first technique, the resistive skin of the internal wall of the air intake is made up of a plurality of (for example, four to ten) rigid panels corresponding to angular sectors of the central duct of the air intake as illustrated in FIG. 2. The resistive skin of these sectors is a rigid shell obtained by molding and draping.

The tooling necessary for manufacturing a resistive skin comprising a plurality of sectors is complex and expensive given the size of the sectors and the shape of the duct of the air intake. Also, and especially, in addition to being fastened to the front frame 101 and rear frame 104, the different sectors have to be fastened together with the aid of fishplates, which have a non-negligible negative impact on drag.

To reduce the production costs and eliminate the fishplates, a second technique has been proposed, which consists in manufacturing the resistive skin of the internal wall of the air intake with the aid of a succession (in the orbital direction) of longitudinal strips which are arranged side by side all around the duct. The front end of each skin strip is fastened to a front shroud forming a circular flange which makes it possible to fasten the duct obtained to the front frame of the air intake; analogously, the rear end of each skin strip is fastened to a rear shroud forming a circular flange for fastening the duct obtained to the rear frame of the air intake. The strips are furthermore welded together along their longitudinal edges in order to form a continuous skin around the entire circumference of the duct.

The known strips of resistive skin can be manufactured in kilometers at low cost and the assembly thereof makes it possible to give the duct the desired shape. They do not require any fishplates and do not cause drag. This second technology is therefore advantageous.

However, the use of the front and rear shrouds, to which the ends of the strips are fastened, exhibits a drawback. Viewed in section in a longitudinal plane containing the central axis of the air intake, the rear shroud has the shape of a bracket having a first leg contained in a transverse plane (this first leg forms a flange for fastening the duct to the rear frame) and a second leg on which the rear ends of the strips rest and to which they are fastened, this second leg extending substantially in the longitudinal direction around the entire circumference of the duct. Over the width (dimension in the longitudinal direction) of this second leg, perforations in the resistive skin are blocked by the leg and no acoustic treatment is possible. No damping core (honeycomb) is provided at the front and rear shrouds. The presence of these shrouds, which is necessary for fastening the strips of resistive skin to the front and rear frames of the air intake, consequently reduces the length (in the longitudinal direction of the air intake) of acoustic treatment and moreover adds to the mass of the air intake.

SUMMARY OF THE INVENTION

The invention aims to remedy these drawbacks by proposing a new acoustic material for manufacturing the internal wall of an air intake, which is simple to produce at low cost, on an industrial scale, and which makes it possible to manufacture an air intake internal wall that has an increased acoustic treatment length. The invention extends to a new method for manufacturing the internal wall of an air intake, which is particularly simple and results in an air intake having a reduced mass and enhanced acoustic performance.

To this end, the invention proposes a strip-form acoustic material for manufacturing a resistive skin of an aircraft nacelle air intake internal wall, the strip having a length in a longitudinal direction, a width in a transverse direction, a thickness and axial ends. The material according to the invention is characterized in that, at at least one of the axial ends of the strip, in an end portion of its length, the strip of material is folded in a substantially transverse plane.

The invention extends to an aircraft air intake internal wall comprising a resistive skin configured to allow acoustic waves to pass through and a cellular core configured to damp the acoustic waves, characterized in that:

the resistive skin is made up of strips according to the invention, in other words, the resistive skin is made up of a succession, in an orbital direction, of strips of acoustic material extending longitudinally, each strip being folded in a transverse plane towards the outside of the air intake at at least one of its axial ends, in an end portion of the length of the strip, the folded end portions of the strips forming a rear or front flange for fastening the resistive skin of the air intake internal wall to a frame of the air intake, the cellular core extends longitudinally as far as the rear or front flange.

In other words, the invention proposes strips of resistive skin having an integrated fastening flange. This feature does not prevent the strips from being manufactured in kilometers at low cost. However, the presence of the integrated fastening flange does make it possible to do away with the use of the previously known shrouds at at least one of the ends of the duct of the air intake. At this end of the duct, it is now possible to provide for the cellular core of the acoustic wall to extend as far as the fastening flange. The air intake duct obtained consequently has an increased acoustic treatment length.

According to one possible feature of the invention, each strip of resistive skin has a folded end portion at each of its axial ends. Therefore, in an air intake according to the invention, the folded end portions of the strips used to make up the resistive skin of the internal wall form both a rear flange for fastening the resistive skin of the internal wall of the air intake to a rear frame of the air intake and a front flange for fastening the resistive skin of the internal wall of the air intake to a front frame of the air intake.

According to one possible feature, the strip-form acoustic material according to the invention comprises successively, in the direction of the thickness of the strip:

a first layer made of a fiber-reinforced polymer, the first layer having perforations or micro-perforations, a second layer made up of a metal fabric (or wire mesh) or a thin metal sheet or a thin sheet made of thermoplastic material.

The second layer may have a small thickness, preferably between 0.05 mm and 0.2 mm.

The first layer and the second layer may either be situated on the internal duct side of the air intake or be in contact with the aerodynamic flow. If the first layer is intended to form the aerodynamic face of the resistive skin of the air intake (and the second layer the internal face of this resistive skin), the folded end portion(s) are folded on the opposite side from the first layer. The other way round is also possible (the aerodynamic face is then the second layer and the folded end portions are folded on the opposite side from the second layer). Or, put another way, the folded end portion(s) are folded on the same side as the first layer.

According to one possible feature, besides the two abovementioned layers, the strip-form material according to the invention comprises a third layer formed of tapes made of a fiber-reinforced polymer, the tapes being spaced apart from one another in the transverse direction of the strip so as to form longitudinal reinforcing crenellations, the first layer not having perforations or micro-perforations next to the tapes forming the third layer.

According to one possible feature, the first layer of the strip does not have perforations or micro-perforations in its folded end portion(s).

In this embodiment, provision may be made for the folded end portion(s) not to have a third layer. In other words, in an air intake in which the internal wall is manufactured with the aid of such strips, the longitudinal reinforcing crenellations end against the fastening flange(s) formed by the folded end portions of the strips.

According to one possible feature, the strips of acoustic material making up the resistive skin of the internal wall each comprise:

a first layer forming a visible face of the internal wall of the air intake, the first layer being made of a fiber-reinforced polymer, the first layer being perforated or micro-perforated, a second layer made up of a metal fabric, a third layer formed of tapes made of a fiber-reinforced polymer, the tapes extending mainly in the longitudinal direction of the strip of material and being spaced apart from one another in the transverse direction of the strip, the tapes thus forming longitudinal reinforcing crenellations, the first layer not having perforations or micro-perforations next to the tapes. The folded end portion(s) of the strip do not have perforations or micro-perforations in the first layer and do not have a third layer.

The invention extends to an aircraft nacelle comprising an air intake having an internal wall according to the invention. It also extends to a propulsion unit equipped with such a nacelle, and to an aircraft comprising at least one propulsion unit equipped in this way.

According to one possible feature, the strip-form material according to the invention has a swage at each of its longitudinal edges, making it easier to assemble two strips that follow one another in the orbital direction of the air intake. The swage may continue into the folded end portion(s) of the strips, i.e., in a radial direction of the air intake.

BRIEF DESCRIPTION OF THE DRAWINGS

The invention, according to one exemplary embodiment, will be understood better and the advantages thereof will become more clearly apparent upon reading the following detailed description, which is given by way of entirely non-limiting indication, with reference to the appended drawings, in which.

Identical elements shown in the abovementioned figures are identified by identical reference numerals.

DETAILED DESCRIPTION OF THE PREFERRED EMBODIMENTS

Figure 1:
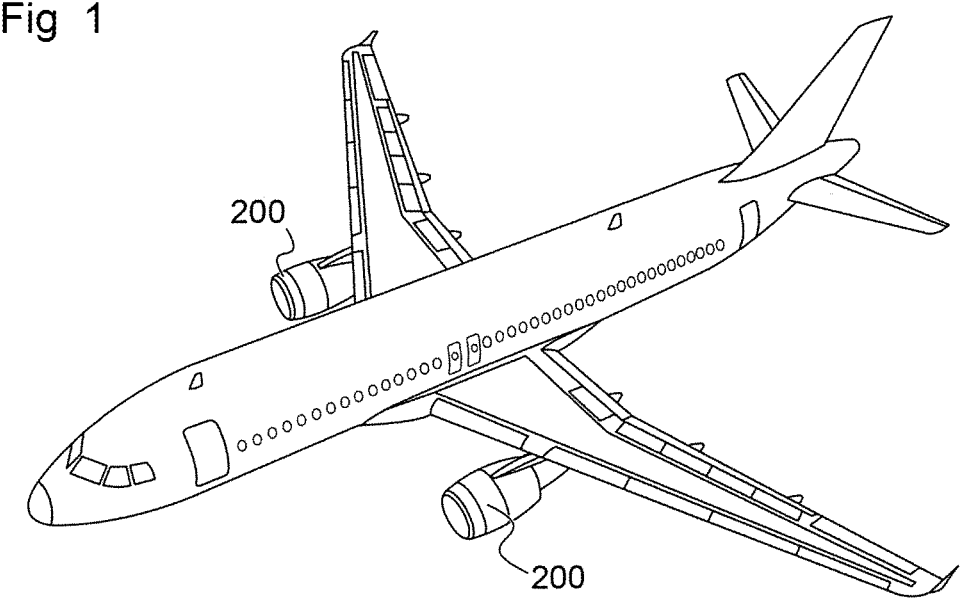
FIG. 1 is a perspective view of an aircraft.
Figure 2:
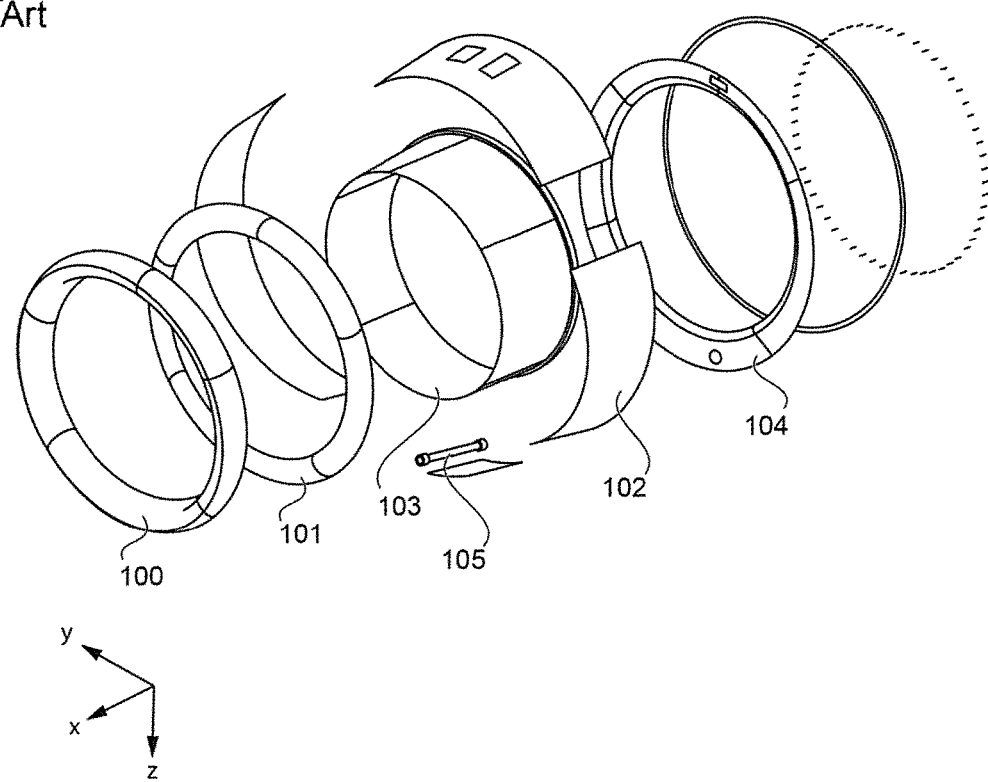
FIG. 2 is an exploded perspective view of a prior art air intake.

FIG. 1 shows a two-engined aircraft, the two nacelles 200 of which have an air intake that is capable of being equipped with a resistive skin produced from strips of material according to the invention.

Figure 3:
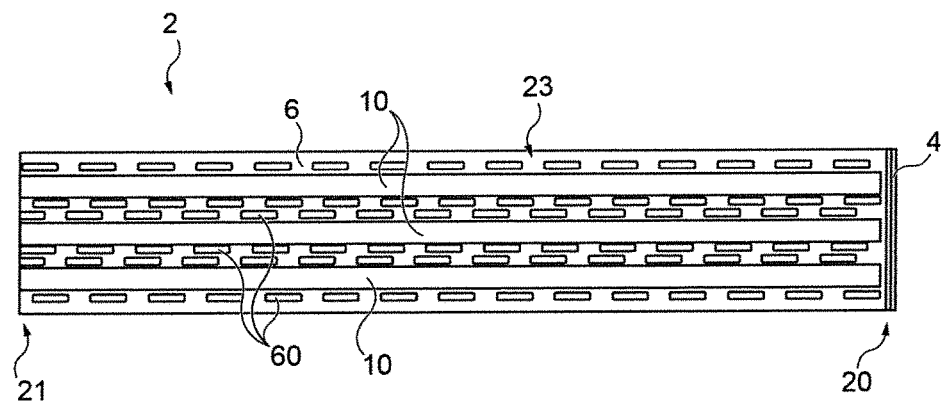
FIG. 3 is a top view of a first embodiment of a strip of material according to the invention.
Figure 4:
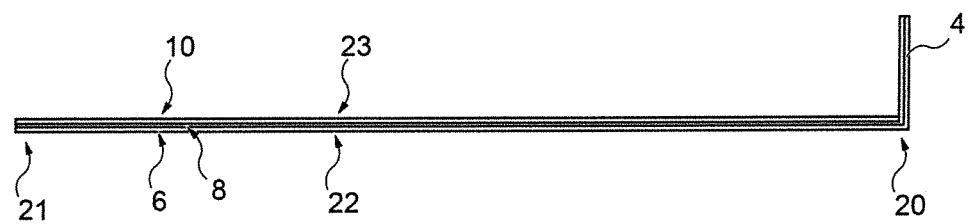
FIG. 4 is a profile view of the strip of material in FIG. 3.

FIGS. 3 and 4 show a first embodiment of a strip of material according to the invention. The material is in the form of a strip 2 which, in the example, is a multilayer strip, comprising a first layer 6 made of fiber-reinforced polymer, i.e., a layer of fibers embedded in a polymerized resin. The fibers may be chosen from carbon fibers, glass fibers, Kevlar fibers, etc., while the polymer may be chosen from thermoplastic resins such as the resins from the family of polyether ether ketones (PEEKs) and resins from the family of polyetherimides (PEIs).

This first layer 6 extends over the entire surface area of the strip of material; it determines the frontal dimensions (width and length) of the strip. The first layer 6 also forms a first frontal face 22 of the strip, which is intended to be the visible face of an aircraft air intake internal wall and to be in contact with an aerodynamic flow.

The first layer 6 has micro-perforations 60 that are elongate, rectangular in the example (in top view), and extend mainly in the longitudinal direction of the strip. By way of illustration, these micro-perforations have a width of between 0.15 mm and 0.5 mm, preferably between 0.3 mm and 0.4 mm, and a length of between 2 mm and 12 mm, preferably between 3 mm and 5 mm.

The strip of material 2 also comprises a metal fabric 8, which forms a second layer that entirely covers the first layer. This second layer helps to damp the acoustic waves (in particular by thermal dissipation) and therefore makes it possible to reduce drag by limiting the perforations that are necessary in the first layer. The dimensions of the perforations in the first layer 6 and the characteristics of the metal fabric 8 (wire diameter, size of meshes, etc.) are advantageously chosen such that the open area ratio (OAR) of the two assembled first layers is around 22-23%, the OAR being the ratio between the open area (total surface area of the perforations) on the surface of the strip not including the folded portions, that is to say the percentage of open area (surface area of the perforations) per unit of skin surface (not including the folded portions).

Lastly, the strip comprises a third layer made up of tapes 10 which form longitudinal reinforcing crenellations on the second frontal face 23 of the strip. These tapes 10 are preferably made of fiber-reinforced polymer, the fibers and the polymeric resin of which are chosen from the families listed above with regard to the first layer 6. The tapes 10 are thus made, for example, of carbon fibers impregnated with a PEI resin. As a variant, the tapes may be metallic, for example made of titanium or of stainless steel. They may also be covered with a surface coating that promotes their adhesion to the second layer 8 and/or to the first layer 6.

The first layer 6 and the third layer may be made from the same fiber-reinforced polymer, with fibers that extend in the same direction(s).

As a variant, the fibers of the first layer 6 are essentially oriented in the longitudinal direction of the strip in order to take up the axial loads to which the strip (or the internal wall of the air intake) is subjected, while the fibers of the third layer are oriented in the transverse direction of the strip in order to take up the orbital and radial loads to which the air intake internal wall is subjected.

Preferably, the first layer 6 does not have micro-perforations 60 next to the reinforcing tapes 10. This is because providing holes next to the strips would have no effect in terms of acoustics (the holes being blocked by the tapes) and would therefore unnecessarily add to drag.

According to the invention, the strip of material 2 has an end portion 4 folded in a transverse plane, at at least one of its ends (in this case the end 20). In the example illustrated, the other end 21 of the strip is not folded, but it is possible to provide a folded portion at this end too.

Preferably, as illustrated, the metal fabric 8 entirely covers the first layer 6, along the entire length of the strip 2, including in the folded end portion 4 in order to stiffen the latter (and the fastening flange obtained when the strips are assembled to form an air intake internal wall). As a variant, the choice may be made to cover the first layer with the metal fabric apart from in the folded end portion 4.

By contrast, preferably, the third layer (reinforcing tapes 10) does not cover the folded end portion 4, in order to make it easier to fold this portion.

Figure 5:
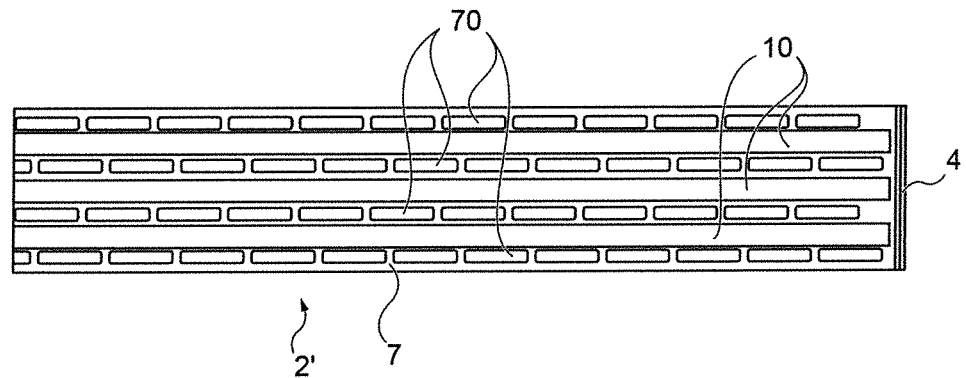
FIG. 5 is a top view of a second embodiment of a strip of material according to the invention.

FIG. 5 illustrates a second embodiment of a strip of material according to the invention. This strip 2' differs from the strip 2 only in that the first layer 7, which may be similar to the above-described first layer 6 in terms of material, is provided with perforations 70 that are elongate, for example rectangular or elliptical, instead of the micro-perforations 60. These elongate perforations advantageously have a width of between 1 mm and 3 mm, preferably between 1.5 mm and 2 mm, and a length of between 10 mm and 40 mm, preferably between 20 mm and 30 mm. Here too, no perforations are provided in the first layer 7 next to the tapes 10.

The profile view of this second embodiment is identical to that of the first embodiment and can therefore be seen in FIG. 4.

Such a strip-form material can easily be produced in kilometers.

To this end, for example:

use is made of:

a first ribbon of fiber-reinforced polymer corresponding to the first layer, packaged as a first roll, a "second" ribbon of metal fabric packaged as a second roll, the first and the second ribbon having an identical width corresponding to the width of the strip to be manufactured, a "third" ribbon of fiber-reinforced polymer corresponding to the third layer, packaged as a third roll, the width of which corresponds to the width of three tapes 10, the second ribbon is pressed onto the first ribbon while they are being unwound, then the two superposed ribbons are fixed together along their entire width, while they travel along, in a first ultrasonic welding station;

the third ribbon passes through a cutting station while it is being unwound, in order to be cut into tapes, and the tapes travelling along are positioned on the first ribbons travelling along at the outlet of the first ultrasonic welding station;

the whole passes through a second ultrasonic welding station comprising three sonotrodes for fixing the three tapes 10 to the second ribbon;

at regular intervals, the progression of the third ribbon is stopped to allow a length of strip, corresponding to the length of the folded end portion 4, which does not have reinforcing tapes 10, the length of the portion of strip provided with tapes that is created between two portions that do not have tapes corresponding to the length of the duct of the air intake to be manufactured.

The kilometers-long tape that is obtained is then cut into individual strips, at one of the ends of the tapes (for example, at the upstream end of the tapes, in the direction of travel of the ribbons).

If the desire is to create individual strips of material having two folded end portions, it is enough to provide, in the kilometers-long strip, portions without tapes that are twice as long and to cut the kilometers-long strip at the middle of each of these portions without tapes.

Each individual strip is then folded at a fold line corresponding to the junction between the portions that have and do not have tapes 10, respectively.

In order to produce the internal wall of an air intake, strips of material 2 arranged side by side are assembled in a mold having the shape of an angular sector of the air intake duct to be manufactured. The adjacent longitudinal edges of two successive strips in the orbital direction are welded together with the aid of a sonotrode, including at their folded end portion 4. The operation is repeated so as to form the entire circumference of the duct. The folded end portions of all the assembled strips then form a circular flange extending in a transverse plane (orthogonal to the central axis of the air intake), making it possible to fix the duct to a frame of the air intake.

It should be noted that, in the internal wall of the air intake, the angle that each strip forms between its folded end portion and the main portion (the rest) of the strip is not necessarily a right angle at the fold. Specifically, during the manufacture of the internal wall (or beforehand), the main portion of each strip, which is flat in the appended figures, is shaped so as to have one or more curves in the longitudinal direction of the strip (that is to say along the X axis of the air intake). However, all the strips used exhibit the same angle in order that the folded end portions 4 are located in one and the same plane, a transverse plane (i.e., one that is orthogonal to the X axis of the air intake), when the strips are assembled.

The invention is not limited to these examples and extends to all the variants that fall within the scope of the appended claims. Thus, for example, the strip-form material is not necessarily made up of the three layers described above.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An internal wall of an aircraft air intake comprising:
a resistive skin configured to allow acoustic waves to pass through, and
a cellular core configured to damp said acoustic waves, wherein the resistive skin is made up of a succession, in an orbital direction, of strips of acoustic material, each strip having a length in a longitudinal direction, a width in a transverse direction, a thickness and axial ends, each strip of material being folded in a substantially transverse plane at at least one of the axial ends of the strip, in an end portion of the length of the strip, the folded end portions of the strips forming a rear or front flange for fastening the resistive skin of the air intake internal wall to a frame of the air intake, each strip comprising:
a first layer forming a visible frontal face of the air intake internal wall, said first layer being made of a fiber-reinforced polymer, the first layer being perforated or micro-perforated,
a second layer made up of a metal fabric or of a thin metal sheet or a thin sheet made of thermoplastic material disposed on the first layer on a surface of the first layer opposite the visible frontal face of the air intake internal wall and forming a second frontal face of the air intake internal wall opposite the visible frontal face and further forming a portion of the front or rear flange,
a third layer formed of tapes made of a fiber-reinforced polymer disposed on at least one of the first layer and the second layer such that the third layer forms a portion of the second frontal face of the air intake internal wall, said tapes extending mainly in the longitudinal direction of the strip and being spaced apart from one another in the transverse direction of the strip, the tapes thus forming longitudinal reinforcing crenellations, the first layer not having perforations or micro-perforations next to said tapes,
wherein the folded end portion of the strip does not have perforations or micro-perforations in the first layer, and
wherein the third layer terminates such that the third layer does not extend into the rear or front flange.

2. The aircraft air intake internal wall according to claim 1, wherein the strips of acoustic material making up the resistive skin are folded in a plane transverse to each of their axial ends, the folded end portions of said strips forming both a rear flange for fastening the resistive skin of the internal wall to a rear frame of the air intake and a front flange for fastening the resistive skin of the internal wall to a front frame of the air intake.

3. The aircraft air intake internal wall according to claim 1, wherein the folded end portion is folded on the opposite side from the first layer.

4. The aircraft air intake internal wall according to claim 1, wherein the folded end portion is folded on the same side as the first layer.

5. An aircraft nacelle comprising an air intake having an internal wall according to claim 1.

6. An aircraft propulsion unit comprising a nacelle according to claim 5.

7. An aircraft comprising at least one propulsion unit according to claim 6.

8. The aircraft air intake internal wall according to claim 1, wherein the resistive skin has a frontal face in contact with an aerodynamic flow, wherein each strip of material is folded in a direction away from the aerodynamic flow.

* * * * *